Patented Dec. 6, 1927.

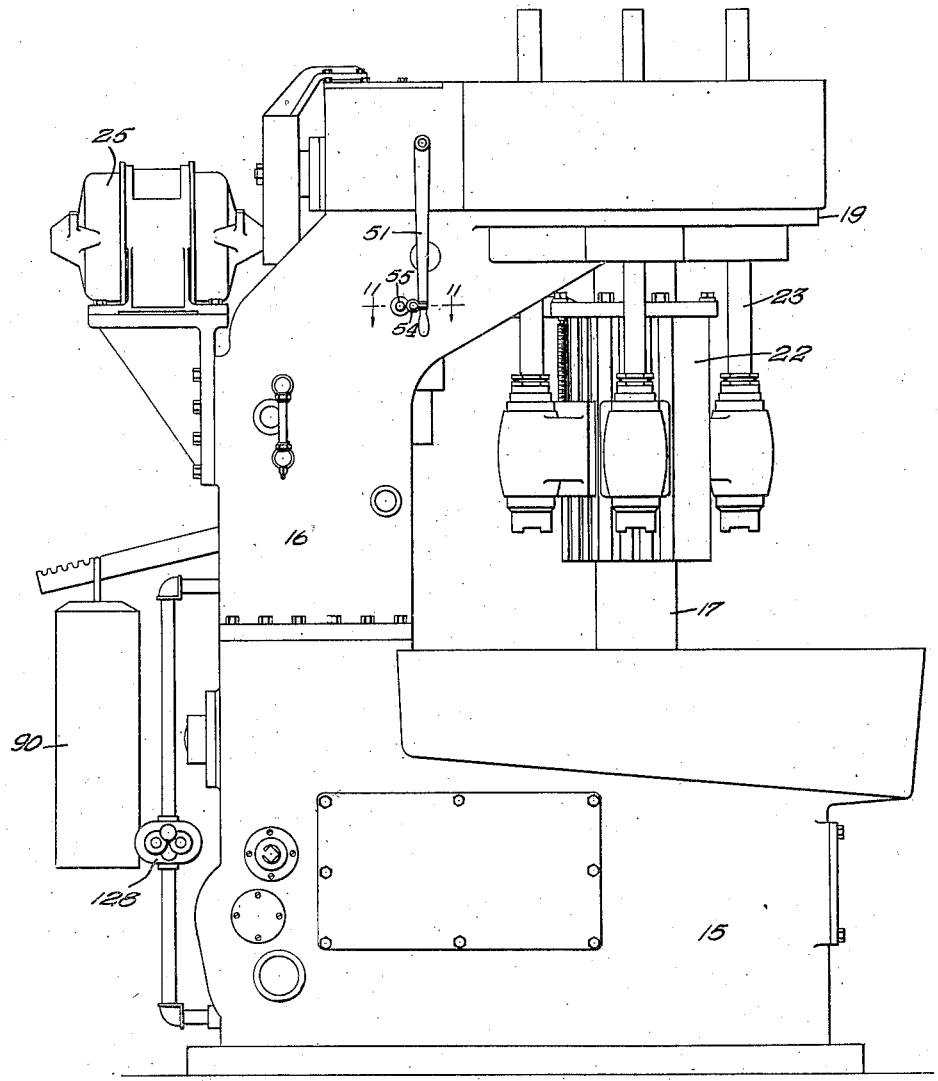

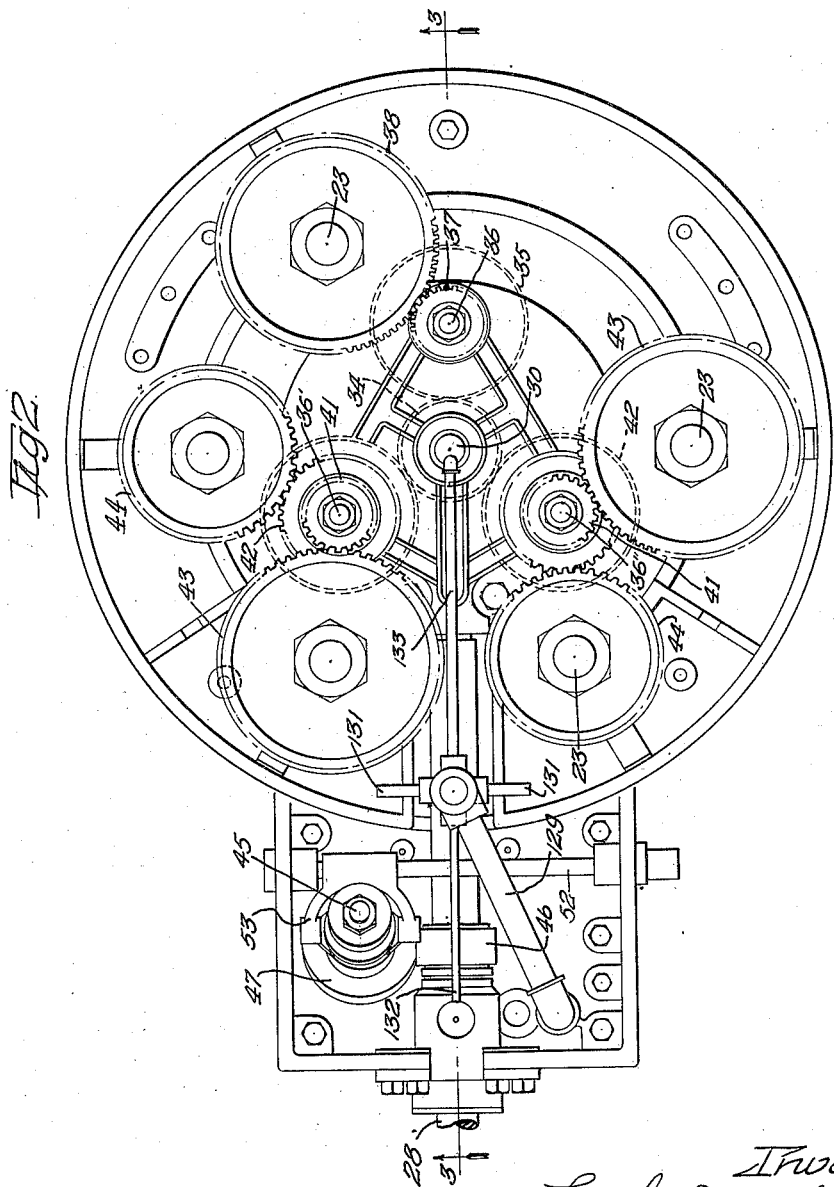

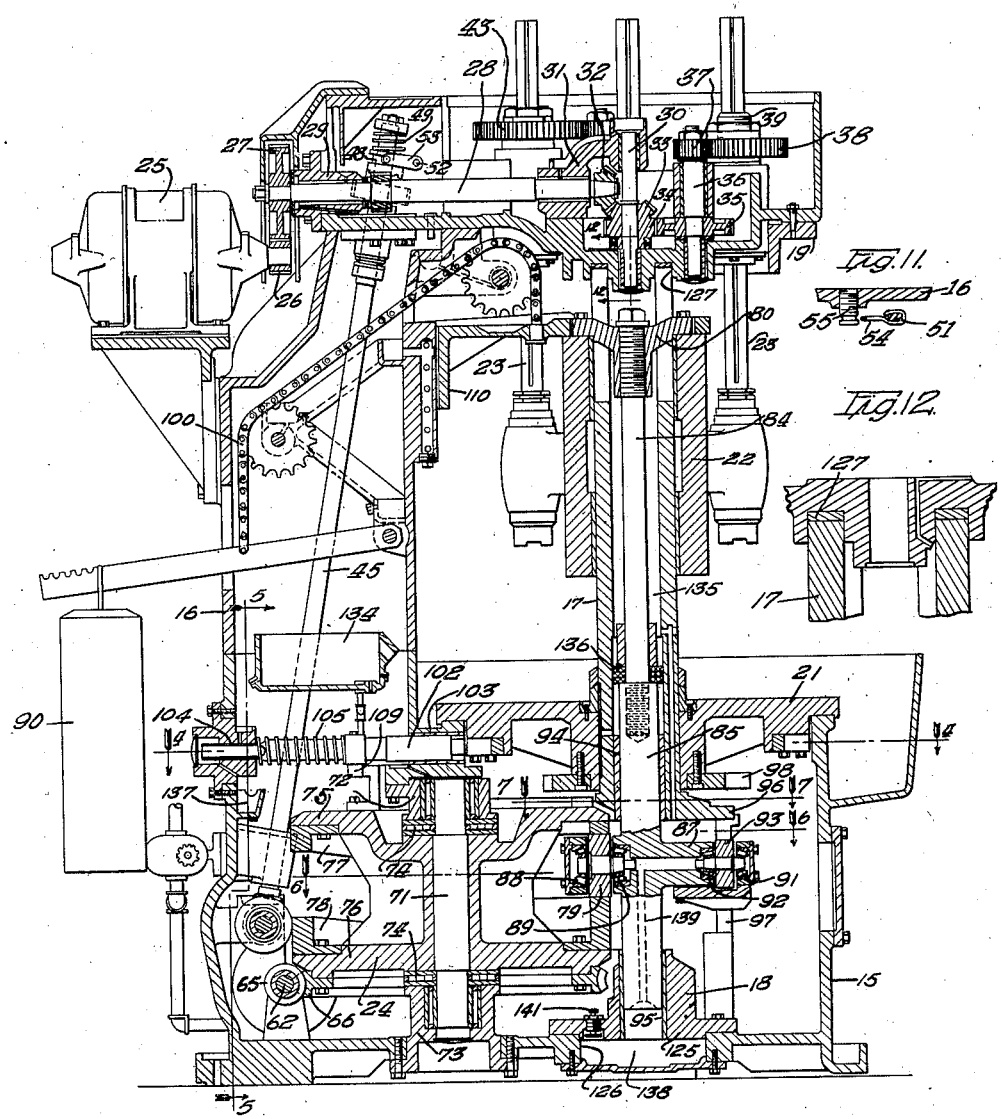

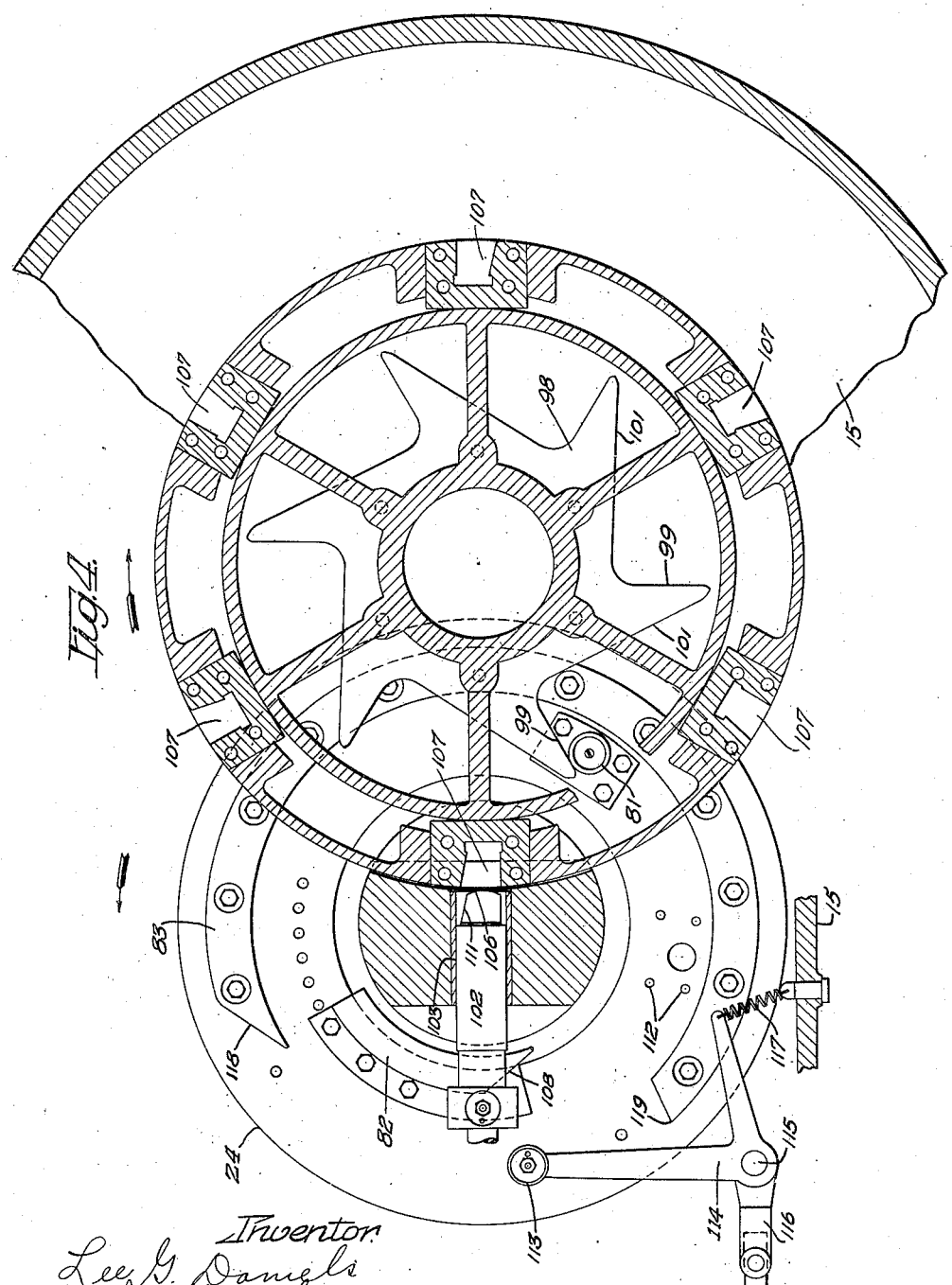

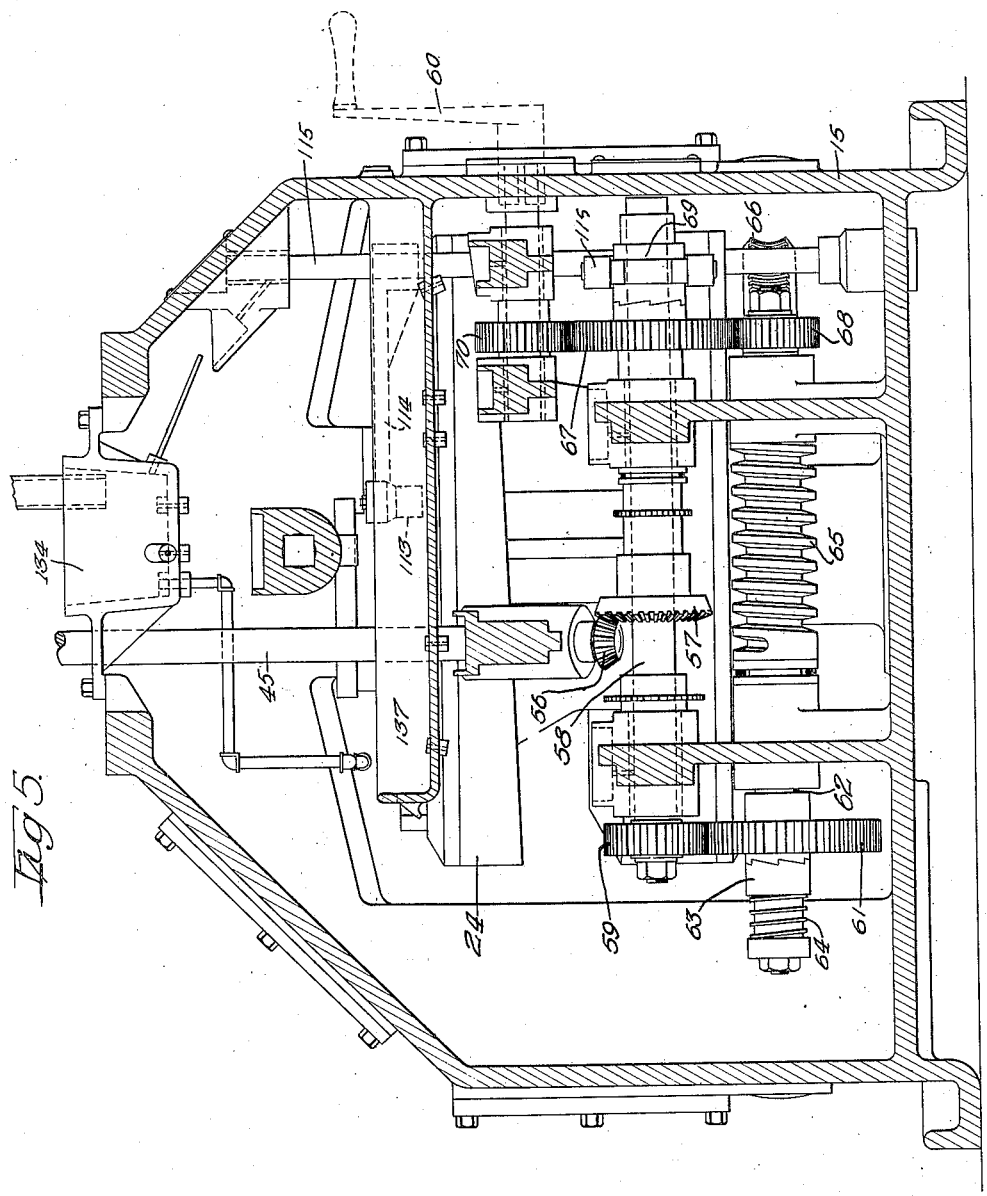

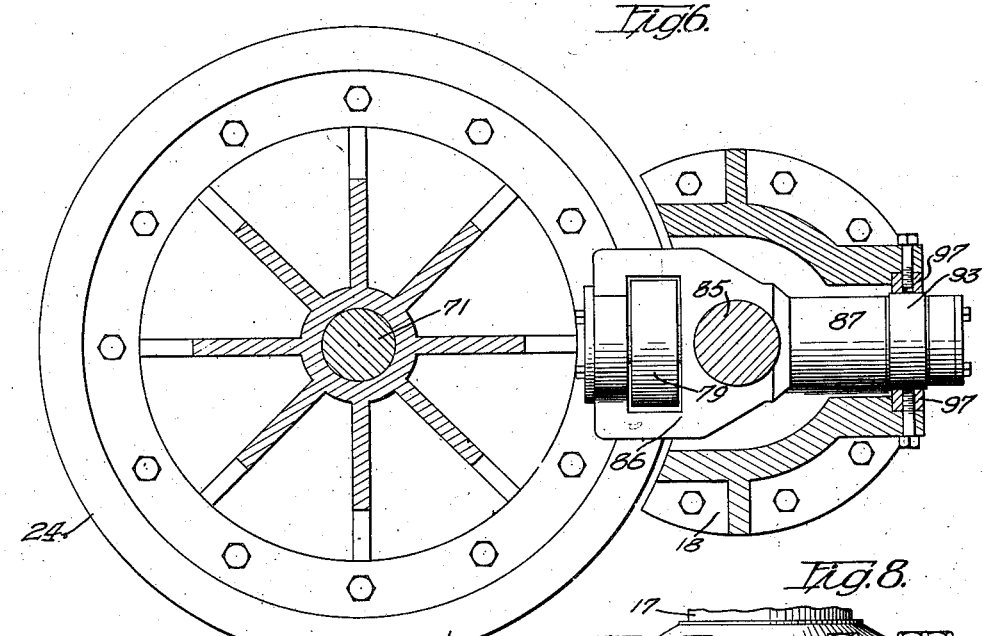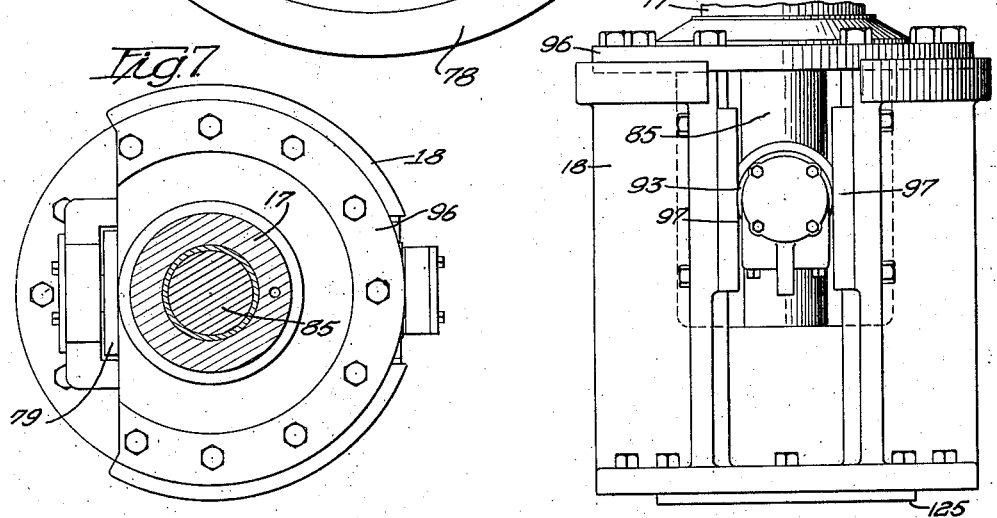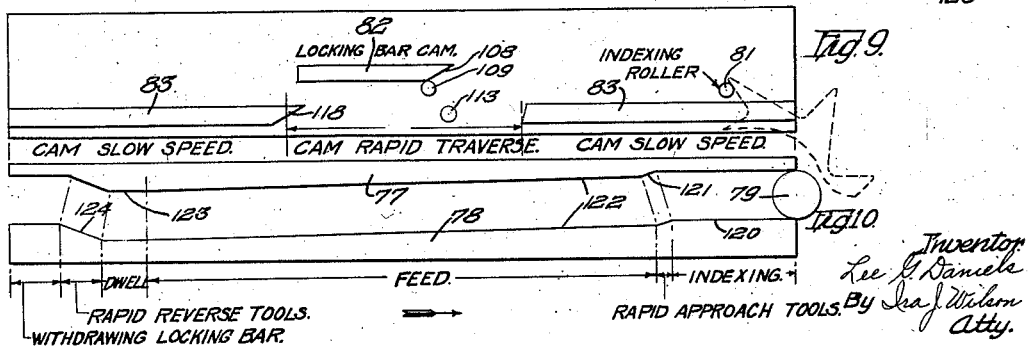

1,651,948

UNITED STATES PATENT OFFICE.

LEE G. DANIELS, OF ROCKFORD, ILLINOIS.

AUTOMATIC MACHINE TOOL.

Application filed April 17, 1922. Serial No. 553,761.

This invention relates in general to automatic machine tools in which a series of automatically controlled cutting operations are successively performed on a work-piece or on a multiplicity of work-pieces. More particularly, the invention is especially applicable to that type of machine characterized by a multiple spindle tool-carrier, a work-carrier adapted to be indexed, and mechanism for automatically moving the tool-carrier for bringing the tools into and out of cutting relation to the work-pieces and for indexing the work-carrier to successively move said work-pieces into operative relation with the different tools, thereby to perform a series of cutting operations on each work-piece. The invention has further reference to automatic machine tools without limitation as to the number of tool spindles.

Machines of this character are intended primarily, as a labor saving factor and for promoting economy and uniformity in the production of parts which are made in large numbers. It is desirable, therefore, that the machines themselves shall be capable of economical production, operation and maintenance. Heretofore, in machines of this type the tool and work carriers have been operated by devices or mechanisms including trains of gearing, clutches, motion-compensating devices, etc., which in turn have been controlled to operate in the desired sequence by control mechanism generally in the form of cams of various kinds. This intermediate operating mechanism has been of a more or less complicated nature, quite apt to get out of working order; and in practice it has been found to require considerable attention for maintenance in proper running order. Furthermore, such intermediate operating mechanism adds considerably to the cost of production of these machines. In the present invention, I have very materially improved machines of this type by eliminating to a large extent said intermediate operating mechanism, thus simplifying the construction, greatly reducing the number of parts, securing more simple and direct action of forces, obtaining a higher degree of efficiency in operation, and promoting economy in maintenance and upkeep of the machine. In other words, my object has been to automatically control and operate the tool and work carriers in a most direct and efficient manner, and to this end I employ a rotary cam device which not only controls but directly operates the tool and work carriers in the desired timed relation. This cam device is arranged in a particularly advantageous manner with relation to the tool and work carriers for moving the former back and forth in rapid approach, feed and rapid reverse movements and for indexing the latter. I also employ said cam device for operating a locking bar which locks the work carrier in indexed position.

I have also aimed to provide a novel mechanism for driving the tool spindles and for operating the tool-carrier and work-carrier in the desired sequence, by which the power may be transmitted in a most efficient manner through the several trains of operating parts and by which the mechanism for operating the tool and work carriers will be driven from that for operating the spindles and may be disconnected at will from the latter.

Further objects are to provide a new and improved assembly of parts characterized by the interfitting of certain units to produce a rigid and substantial construction which insures against vibration under heavy duty; to improve the frame construction and assembly of parts with the view to economy in production; to improve the means for operating the tool-carrier and the means for operating the work-carrier, to improve the driving mechanism; and to provide an improved means and system of lubricating the machine.

Other objects and attendant advantages will be appreciated by those skilled in the art as the invention becomes better understood by reference to the following description when considered in connection with the accompanying drawings, in which—

Figure 1 is a side elevation of a multiple spindle machine embodying my invention;

Fig. 2 is a top view of the machine with the top covers removed;

Fig. 3 is a vertical sectional view taken substantially on the line 3—3 of Fig. 2;

Fig. 4 is a fragmentary horizontal sectional view taken substantially on the line 4—4 of Fig. 3;

Fig. 5 is a vertical sectional view taken substantially on the line 5—5 of Fig. 3;

Figs. 6 and 7 are horizontal sectional views taken substantially on the lines 6—6 and 7—7, respectively, of Fig. 3;

Fig. 8 is an elevation of the parts shown at the right-hand end of Fig. 6;

Figs. 9 and 10 are diagrammatic developments of the cams on the top and periphery, respectively, of the cam-carrying device; and Figs. 11 and 12 are detail sectional views taken on the lines 11—11 and 12—12 of Figs. 1 and 3, respectively.

In illustrating the principles of the present invention, I have taken as an example, a multiple spindle machine, in which the tools are advanced to the work in a rapid approach and a feed movement and are retracted in a rapid reverse movement, and the work-pieces are carried in suitable chucks, fixtures or the like, supported on a carrier or table which is adapted to be indexed in step-by-step movements to thereby successively present the work-pieces to the different tools. Such a machine might be either horizontal or vertical, and in the present instance it is vertical. Furthermore, in machines of this type either the tool spindles or the work-holding chucks may be revolved, and in the present instance the spindles are revolved.

The frame of the present machine comprises, generally stated, a base 15, side column 16 fixed to the base, center column 17 fixed to the base through the intermediary of a bracket 18, and a top structure 19 rigidly joining the upper ends of the side and center columns. The principal operating parts are a work-table or carrier 21 supported on the base to revolve about the center column, a tool slide or carrier 22 slidable lengthwise on the center column and carrying a plurality of circumferentially spaced tool spindles 23, and a rotary cam-carrying device 24 (designated generally) for operating the work and tool carriers and other devices through a cycle of operations. The mechanism for driving the spindles, the variable speed mechanism for driving the cam-carrying device, the cam-carrying device proper, and the parts operated by said cam-carrying device will be described substantially in the order named.

In a machine of this type, I prefer to employ an electric motor 25 as the source of power and to support this motor on the upper portion of the machine to enable to most direct connection with the spindles for driving the latter at constant speeds, each spindle having a definite speed, which may be different from the others according to the nature of its work. The spindle speeds may be changed as will be presently seen; and the motor 25 supported on the upper portion of the side column 16, has a spur pinion 26 meshing with a gear 27 fixed to a horizontal drive shaft 28 journaled in bearing brackets 29 and 31 suitably fixed to the top frame structure. The drive shaft 28 disposed radially with respect to the center column, carries at its inner end a fixed bevel gear 32, which meshes with a central bevel gear 33 formed integral with a spur gear 34, these gears being mounted on a vertical shaft 30 journaled in upper and lower bearings, as shown plainly in Fig. 3. The central spur gear 34 meshes with three equally spaced gears 35 fixed respectively to vertical shafts 36, 36' and 36" journaled in suitable upper and lower bearings, the former of which is carried by the bearing bracket 31 and the latter by the top frame structure. The shaft 36 is equipped at its upper end with a fixed spur gear 37 meshing with a gear 38 fixed to a spindle driving sleeve 39 in which its respective tool spindle 23 is splined. Each shaft 36' and 36" is equipped at its upper end with a pair of spur gears 41 and 42 of different diameters meshing respectively with gears 43 and 44 which drive the two adjoining spindles. Each intermediate shaft 36' and 36" drives two tool spindles at different speeds, and any of the gears between the intermediate shafts and spindles may be changed for others of different ratio to thereby change the speed of the respective spindles. It will be seen that when the motor is in operation the spindles may be driven at definite constant speeds determined by the gearing described.

The variable speed mechanism which will now be described for driving the cam-carrying device is located within the base and adapted to be driven from the horizontal drive shaft 28 through the agency of a vertical shaft 45 extending through the side column 16. As shown in Figs. 2 and 3, there is fixed to the drive shaft 28 a spiral gear 46 which meshes with a similar gear 47 loose on the shaft 45 and adapted to be connected thereto by means of the shiftable clutch element 48. A compression spring 49 tends to urge the clutch element 48 into engagement with a complemental clutch face on the gear 47 and is adapted to be moved out of such engagement by means of a hand lever 51, Fig. 1, at the side of the machine. This hand lever connected to a rock shaft 52 which carries a yoke 53 for shifting the clutch element, is adapted to be locked in the clutch disengaging position by any suitable means, such for example as that shown in Fig. 11, consisting of a spring wire loop or hook 54 on the lever engageable over the grooved end of the stud 55 fixed to the side column. It will be manifest that the shaft 45 and all parts driven thereby, may be disconnected from the drive shaft 28 by the operator swinging the hand lever 51 in a clockwise direction, Fig. 1, and engaging the loop 54 over the stud 55, thereby locking the clutch in disengaged position under pressure of the spring 49. This affords a positive lock which requires a definite act on the part of the operator to engage the clutch, namely, that of releasing the loop 54 from the stud 55.

The upright shaft 45 journaled in suitable bearings at its upper and lower ends, is equipped at its latter end as shown in Fig. 5, with a bevel gear 56, which meshes with a gear 57 fixed to a horizontal constant speed shaft 58 suitably journaled in the base. The shaft 58 carries a fixed spur gear 59 meshing with a gear 61 loose on a variable speed shaft 62, suitably journaled below and parallel with the constant speed shaft 58. A clutch element 63 splined on the shaft 62, is constantly urged by a compression spring 64 into engagement with a complemental clutch face on the gear 61. Said variable speed shaft 62 carries a fixed worm 65 which meshes with a worm wheel 66 fixed to the rotary cam device which will be described hereinafter. The constant speed shaft 58 also carries a loose spur gear 67 of greater diameter than the gear 59 and in mesh with a gear 68 fixed to the shaft 62. The gear 67 may be connected to or disconnected from the shaft 58 by suitable means, such as a clutch element 69 splined on the shaft 58 and movable into and out of engagement with a complemental face on said gear 67. When engaged as shown, the shaft 62 will be driven from the shaft 58 at a higher speed than the latter and the teeth on the clutch element 63 will simply run ahead of those on the gear 61. It follows that by engaging the clutch element 69, the cam-carrying device will be driven at a relatively fast speed through the gears 67 and 68, and that upon disengaging said clutch element, said device will be driven at a slower speed through the gears 59 and 61. The clutch element 69 will be automatically controlled to produce said fast and slow speeds by movement of said cam-carrying device as will be described hereinafter. The worm 65 and consequently the cam device may be operated by hand independently of the power drive as is desired when assembling the machine and when setting up the tools. This is done by means of a hand crank 60 at the control side of the machine, adapted for turning a shaft which carries a gear 70 meshing with the gear 67.

The cam-carrying device 24 mentioned above and shown in Figs. 3, 4 and 6, may be of any construction suitable for carrying cams for performing the functions desired. In view, however, of the enormous pressure that must be transmitted for the feed in a heavy duty machine of this type, I have devised and arranged a device of distinctly novel construction, especially adapted for the conditions and requirements in the instant case. This device comprises a heavy cam-carrying body fixed to a vertical shaft 71 journaled at its upper and lower ends in suitable anti-friction bearings on the brackets 72 and 73. An anti-friction thrust bearing 74 is interposed between each end of the cam-carrying body and the adjacent bearing bracket. The cam-carrying body has upper and lower annular portions 75 and 76 heavily reinforced by radial ribs and adapted for carrying in opposed relation upper and lower cam plates 77 and 78. These cam plates which may be of sectional segmental form are removably secured to said body portions 75 and 76 and define an annular cam-way in which operates a roller 79. This roller or cam follower connected with the tool-carrier as will be presently described, is adapted to be moved in a vertical plane by said cam plates for moving the tool-carrier vertically. Said rotary device also carries on its upper portion 75 a roller 81, Fig. 4, for operating a cam on the work-carrier for indexing the latter, and cam plates designated generally by 82 and 83 for respectively operating a table-locating and locking bar and for controlling the variable speed mechanism for driving the cam device, all of which will be presently more fully described. In the event that it is desired to index the work-carrier two stations instead of one to each revolution of the cam device, an additional roller similar to the roller 81 will be employed, the supporting bracket for which I attach to the cam device by bolts which enter the holes 112. The cam 82 will be lengthened accordingly so that the locking bar will be released at the proper time for entering the second socket 107. It will be obvious that the two rollers 81 will successively index the table, advancing each work holder two stations.

The parts operated by said cam-operating device comprising, generally stated, the means for moving the tool carriage back and forth, the means for indexing the work-carrier, the means for withdrawing and releasing the locating and locking bar, and the means for controlling the variable speed driving mechanism, I will now describe in the order named.

The cam roller 79 is carried by what I term a connecting rod, which reaches upwardly through the center column and is connected to the tool-carrier. This connecting rod, in the present instance, is formed of an upper part 84, threadingly connected to a lower roller-carrying part designated generally by 85. Said lower part 85 is medially shaped to provide diametrically opposed arms 86 and 87, the former of which, as shown in Fig. 6, embraces the roller 79 and provides for carrying anti-friction bearings 88 and 89 for, and at the outer and inner ends of the cam roller 79, and the latter of which carries similar outer and inner bearings 91 and 92 for a guide roller 93. The upper and lower ends of said part 85 are guided in bearings 94 and 95, respectively, in the lower end of the center column and in the column supporting bracket 18 mentioned above. It will be noted at this point that this bracket 18 rigidly attached to the base 15, constitutes the direct means for supporting said center column, and as shown in Figs. 7 and 8, the center column has an enlarged base 96 bolted to the top of the bracket 18. Said bracket carries opposed vertical guide plates 97 between and by which the roller 93 is guided with its axis of rotation in radial alignment with the axis of the rotary cam device. The upper part 84 of said connecting rod is connected to the tool carriage in any suitable manner, as for example by threaded connection to a part 80 having diametrically opposed arms reaching through longitudinal slots in the center column and rigidly bolted to the carriage proper. The connecting rod is made in two parts mainly for economy in manufacture and for convenience in assembling the machine. The cam roller 79 and the guide roller 93 are in co-axial relation, and the purpose of the guide roller is to maintain a theoretical line contact between the cam roller and either of its cam surfaces in radial alignment with the axis of the rotary cam device, and therefore, in flat contact with either of said cam surfaces according to the direction of thrust. By providing a bearing for each end of the cam rollers 79, the cam thrust will be substantially equal at both ends of the roller, consequently there will be no tendency for the roller to tilt and in time cause uneven wear, which would not only impair the accuracy and efficiency of the machine, but would undoubtedly result in injury to the parts. This cam and roller construction per se, forms the subject matter of my co-pending application Serial No. 460,045. The cam plates 77 and 78 are designed to operate the tool-carrier through the direct intermediary of the cam roller 79 and connecting rod at variable speeds and in timed relation with indexing of the work carrier. It will be seen, therefore, that these cam plates not only control the forward and reverse movements of the tool-carrier but actually produce and transmit such movements. The cam plates will therefore, be shaped to advance and retract the tool-carrier at the proper times and speeds to suit the conditions and requirements of the work at hand, or of any particular class of work. To facilitate said cam operation of the tool-carrier, especially in a vertical machine, any suitable means may be employed for counterbalancing the weight of said tool-carrier and its parts. In the present case, I employ a weight 90 for this purpose, this weight being adjustably suspended from a lever of the third class, which is connected by means of a chain 100 trained over suitable sprocket wheels and connected to the tool carriage from overhead. The tool carrier in its vertical movement is guided on the center column 17; and a laterally reaching guide arm 110 fixed to the carrier and associated with a suitable guide surface on the side column 16, serves as an additional guide for preventing displacement of the carriage rotatably about said center column.

Indexing of the work-carrier 21 is accomplished in a simple and novel manner by the provision of a star shaped cam designated generally by 98, fixed to said carrier and adapted to be operated by the roller 81 on the cam-carrying device. This cam has six circumferentially spaced duplicate sections, each adapted for moving the work-carrier through one-sixth of a revolution upon each complete revolution of the cam device. These cam sections correspond with the position of the work-holders on the table or carrier, so that each time the latter is moved through one-sixth of a revolution, the work-holders will be advanced from one station to another. Each cam section has a radially disposed effective surface 99 against which the roller 81 is adapted to bear. Viewing Fig. 4, it will be seen that when the cam-carrying device is revolved in a counter-clockwise direction, its roller 81 will engage the outer end of the cam surface, and moving inwardly along said surface will revolve the work-carrier in a clockwise direction in a variable movement, accelerating from the start to a midway position and then gradually slackening until the locating bar engages in a locating socket in the table as will be presently described. During this indexing movement, it will be observed that when starting the table the cam-carrying device has the greatest leverage advantage by reason of the roller 81 operating on the outer end of the surface 99, and that as the motion of the table is accelerated the leverage advantage decreases. This permits indexing of the table without jar and sudden excessive strains on the driving parts.

The locating and locking bar 102 radially disposed with respect to the table and mounted to slide lengthwise in suitable bearings 103 and 104, is constantly urged inwardly against the periphery of the table by a spring 105. The nose 106 of the locating bar is adapted to enter any of the sockets 107 in the periphery of the work table, which sockets are equal in number to the work-holders and similarly spaced. The locating bar is adapted to be withdrawn by the action of the cam 82 on the cam-carrying device. This cam has an inclined surface 108 adapted to engage a depending roller 109 on the bar for withdrawing the latter. As shown in Fig. 4, the locating bar will be withdrawn before the table commences to index, and the cam 82 will leave the roller 109 before completion of the indexing movement, allowing the nose of the bar to ride on the periphery of the table and enter the next succeeding socket 107. By entering said socket, the inclined surface 111 upon said bar will engage a similarly inclined wall of the socket and under the pressure of the spring 105 will move the table forwardly, in advance of the indexing roller 81, thereby finally locating the table and locking it in indexed position.

The variable speed driving mechanism described above is controlled as to duration of the fast and slow speeds by the cam 83, which actuates means for disengaging the clutch element 69. This means comprises a roller 113 adapted to be actuated by the cam 83 and carried by a lever 114, fixed to an upright shaft 115, which is suitably journaled on the frame and carries a yoke 116 for shifting the clutch element 69. A spring 117 connected with the shaft 115 urges the latter in a clutch-engaging direction. In Fig. 4, the cam follower 113 is in the position with the high speed clutch engaged, and it will be moved by the inclined surface 118 of the cam 83 to disengage said clutch and allow the slow speed clutch to function as described above. It will be observed that the cam plate 83 is of considerable length and the slow speed will be maintained until the follower roller leaves the heel 119 of said cam.

A cycle of operations is as follows: Assuming the machine in operation, the stage shown in the drawings is at the commencement of an indexing movement with the locating bar withdrawn and the tool-carrier in elevated position. This stage is shown diagrammatically in Figs. 9 and 10, which contain a development of the cams on the cam-carrying device and show the position and relative relation of the immediately operated parts. The cams and cam plates travel to the right with respect to the cam followers shown in these views. In this position, the cam-carrying device is propelled by the fast speed clutch, that is, at the rapid traverse speed, by reason of the cam roller 113 being free from the cam 83, as explained above. Assuming this to be the beginning of the cycle, it will be seen that the tool-carrier will be held stationary in elevated position during the table-indexing movement by reason of the straight cam-way 120, Fig. 10. At the completion of this indexing operation and during the rapid traverse movement of the cam device, the roller 79 will be operated by the inclined cam surface 121 for advancing the tools to the work in a rapid approach movement. The present cams are so designed and arranged that the rapid approach is relatively short, the lineal travel of the tools being approximately three-fourths of an inch. At the completion of the rapid approach, the roller 79 enters the feed cam-way 122 and the roller 113 will be operated by the cam surface 118 to reduce the speed of the cam-carrying device to the slow speed, which will be maintained by the cam plate 83 throughout the feed. During the feed, the finished work-piece at the loading station will be removed by the attendant, and a new work-piece substituted. At the end of the feed the tools will be held by reason of dwell portion 123 of the cam, for removing any tool marks from the cuts. At the end of this dwell, the roller 113 will leave the heel 119 of the cam 83, thereby stepping up the speed of the cam device. During this rapid traverse of the cam device the tools will be retracted in a rapid reverse movement by the action of the cam surface 124. As soon as the tools have reached the elevated position, the locking bar will be withdrawn by the action of the cam surface 108 on the roller 109. This completes the cycle of operations, and inasmuch as the drive for the cam device is continuous, the cycle will be continuously repeated until stopped by operation of the hand lever 51. The operations controlled by the cam device may, of course, be changed and varied by proper design and location of the cams. In certain cases where the complete cycle is of relatively short duration, say from 20 to 30 seconds, the parts employed for producing the rapid traverse drive, that is, the cam 83 and parts operated thereby, may be omitted, leaving the cam device propelled at a constant speed.

From the foregoing, it will be manifest that the work and tool carriers are directly operated by a rotary cam device, thus eliminating the more or less complex mechanisms heretofore employed in machines of this type for operating the work and tool carriers. As a result of this principle of operation, a saving of hundreds of parts is effected without depreciating the capacity or scope of the machine. Instead, by eliminating the various trains of gearing, clutches, motion-compensating devices and other mechanisms which are generally controlled by cam devices and function to operate the work and tool carriers, I have by the present invention greatly simplified both the construction and operation of machines of this general class and have materially increased their efficiency and practicability.

Another feature of my invention is the manner in which different units or parts are associated one with the other, with the view of securing a very rigid and durable construction and one which may be produced and assembled economically. I refer to the matter of interfitting connections between certain principal parts, such for example as the bottom bracket casting 18 being shaped to provide a portion 125 fitting within the opening 126 in the base. As a result of this construction, any lateral strains do not have a loosening or shearing effect on the bolts which secure the bracket 18 to the base. In a similar manner the flange 96 on the lower end of the center column seats in the top of the bracket 18, and the upper end of the center column seats in a complemental annular recess 127 in the top structure. The upper and lower bearing brackets 72 and 73 for the trunnion ends of the cam-carrying device are similarly mounted with the result that the cam device which works against great pressure, especially during the feed, is supported in a very substantial manner.

Still another feature is the oiling system, by means of which every bearing and operating part requiring lubrication will be automatically lubricated by gravity feed. More particularly, the oil is delivered by means of a pump 128 to an overhead supply pipe 129 having discharge leads 131, 132 and 133 which empty into reservoirs formed by the top structure, and from which reservoirs the oil either overflows or otherwise discharges to bearings at a lower elevation. From these bearings or parts requiring lubrication, the oil gravitates to intermediate reservoirs, such for example as the reservoir 134 in the side column 16, the reservoir 135 in the center column, the bottom of which is defined by a packing 136, the reservoir 137 on the rear wall of the side column and the reservoir 139 beneath the bracket 18, from whence it is again distributed through discharge leads and the like to the bearings and parts at lower elevations. In the case of the latter reservoir, however, the oil instead of gravitating to lower bearings will be forced by the down stroke of the connecting rod up through the oil passage 139 in said rod and laterally to the bearings for the cam and guide rollers 79 and 93. A check valve 141 prevents back flow from this reservoir. The various oil holes and leads are clearly shown on the drawings.

It is believed that the foregoing conveys a clear understanding of the objects prefaced above, and while I have illustrated but a single working embodiment it should be understood that considerable change might be made in the construction and arrangement without departing from the spirit and scope of the invention as expressed in the appended claims.

I claim:

1. In a multiple spindle machine tool, in combination, a base housing, an upstanding column thereon, a horizontal indexing work table revoluble on the base housing about the column, a tool-carrier guided on the column above the work table, a rotary cam-carrier in the base housing having opposed cams, table indexing means on said cam carrier, a cam roller interposed between said cams, and a connecting rod connected to the cam roller and reaching upwardly through the column and connected to the tool carrier to transmit vertical movement to the tool carrier from rotative movement of the cam carrier.

2. A multiple spindle machine tool as set forth in claim 1, including a guide roller on the connecting rod having guiding contact with the base housing, the cam roller and guide roller being located on opposite sides of the connecting rod on axes radial with respect thereto.

3. A multiple spindle machine tool as set forth in claim 1, including a guide roller on the connecting rod having guiding contact with the base housing, the cam roller and guide roller being coaxial and disposed on opposite sides of the connecting rod.

4. In a multiple spindle machine tool, in combination, a base housing, an upstanding column thereon, a horizontal work table rotatable on the base housing about the column, a tool-carrier guided on the column above the work table, a rotary cam device in the base housing, means operated by the cam device extending through the column for imparting feed movement to the tool-carrier, and mechanism for imparting slow and fast movement to the cam device.

5. In a multiple spindle machine tool, in combination, a base housing, an upstanding column thereon, a horizontal work table rotatable on the base housing about the column, a tool-carrier guided on the column above the work table, a rotary cam device in the base housing, means operated by the cam device extending through the column for imparting feed movement to the tool carrier, mechanism for imparting slow and fast movement to the cam device, and means on the cam device for controlling the periods of said movements.

6. In a machine of the character described, the combination of a frame column, a rotary work-carrier and a reciprocable tool-carrier on said column, a rotary cam-carrying device, a connecting rod in said column connected with the tool-carrier and operated by said device for reciprocating said carrier, means directly operated by said device for indexing the work-carrier, a lock pin for locking the work-carrier in any indexed position, a cam on said device for directly operating said lock pin to withdraw it from the work-carrier, mechanism for revolving said device at different speeds, and a cam on said device for controlling said mechanism.

7. In a machine of the character described, the combination of a rotary work-carrier, a frame column concentric therewith and about which said carrier revolves, a tool carrier reciprocable on said column, a connecting rod within said column connected to said tool-carrier, a cam roller and a guide roller carried by said connecting rod on opposite sides thereof, a rotary cam for operating said cam roller to reciprocate the tool-carrier, and means for guiding the guide roller to maintain the cam roller in proper operative relation to its cam.

8. In a vertical multiple spindle machine tool, the combination of a work-carrier and a multiple spindle tool-carrier in superposed relation and adapted to be relatively indexed, a center column reaching upwardly from the work-carrier and upon which the tool-carrier is slidable, a single rotatable cam-carrier below the work-carrier having opposed cams, and a connecting rod having a roller operated by said cams and reaching upwardly through said column and connected to the tool-carrier for imparting feed movement thereto.

9. In a multiple spindle machine tool, in combination, a base housing, a horizontal rotary work table thereon, an upright column structure on the base housing including a top housing overreaching the work table, a plurality of tool spindles mounted on said upright housing structure above the work table and vertically movable with respect thereto, gearing in the top housing for driving said spindles, mechanism in the base housing for indexing the work table, a rotary cam device for moving the tool spindles vertically, and a prime mover mounted on the upright housing structure and connected to said spindle gearing and the rotary cam device for operating them in timed relation.

10. A multiple spindle machine tool as set forth in claim 9 in which the rotary cam device is located in the base housing and operates the indexing mechanism.

11. A multiple spindle machine tool as set forth in claim 9 in which the rotary cam device is located in the base housing and is connected to the tool spindles by a connecting rod extending upwardly through the center of the work table.

12. A multiple spindle machine tool as set forth in claim 9 in which the driving train between the prime mover and the tool spindles includes means for changing the speed of the latter and the driving train between the prime mover and cam device includes a change speed device actuated by the cam device.

13. In a machine of the character described, in combination, a base housing, a horizontal rotary work table thereon, an upright column structure on the base housing, tool spindles movable vertically on the column structure above the work table, a rotary cam device on a vertical axis connected with the tool spindles for moving them vertically, a worm gear in the base housing coaxial with and connected to the cam device for rotating it, a driving worm meshing with said worm gear, and driving mechanism in the base housing including feed gearing and rapid traverse gearing and controlled by the cam device for operatively connecting either of said gearing to the driving worm.

14. In a machine of the character described, the combination of a base, a side column and a top structure in rigid relative relation, a column having an interfitting connection at its upper and lower ends with said top structure and base respectively, a rotary work-carrier and a reciprocable tool-carrier on said column, and mechanism for indexing said work-carrier and reciprocating said tool-carrier in timed relation.

15. In a machine of the character described, the combination of a base, a side column and a top structure in rigid relative relation, a column having an interfitting connection at its upper and lower ends with said top structure and base respectively, a rotary work-carrier and a reciprocable tool-carrier on said column, mechanism for indexing said work-carrier and reciprocating said tool-carrier in timed relation, a rotary cam device journaled in parts having interfitting connection with the base, and means operated by said cam device for indexing the work-carrier and reciprocating the tool-carrier.

16. In a machine of the character described, the combination of a base housing, a center column fixed thereto, a rotary work-carrier and a reciprocable tool-carrier on said column, a rotary cam device within said base housing having trunnion ends, journal brackets for said ends having interfitting connections with the base housing, means for revolving said cam device, and means operated by said cam device for indexing the work-carrier and reciprocating the tool-carrier.

17. In a machine of the character described, the combination of a base housing, a side column fixed thereto, a top structure fixed to said side column, a center column fixed between the base housing and said top structure by means including a bracket within the base housing for supporting said center column, a rotary work-carrier and a reciprocable tool-carrier concentric with said center column, a rotary cam device within the base housing, mechanism for revolving said device, and means operated by said device for reciprocating the tool carrier including a part guided by said column-supporting bracket.

18. In a machine of the character described, the combination of a base housing, a side column fixed thereto, a top structure fixed to said side column, a center column fixed between the base housing and said top structure by means including a bracket within the base housing for supporting said center column, a rotary work-carrier and a reciprocable tool-carrier concentric with said center column, a rotary cam device within the base housing, mechanism for revolving said device, and means operated by said device for reciprocating the tool-carrier including a part carrying a cam follower and guided above said follower in the center column and below said follower in the column-supporting bracket.

19. In a machine of the character described, the combination of a base, a side column and a center column fixed to the base, a top structure fixed to said columns, a rotary work-carrier and a reciprocable tool carrier on said center column, tool spindles for said tool-carrier, mechanism in said top structure for driving said spindles, mechanism in the base for indexing the work-carrier and reciprocating the tool-carrier, said top structure providing an oil reservoir, oil reservoirs at a lower elevation in said side column and center column, and means whereby oil may gravitate from said upper reservoir to said lower reservoirs and to bearings and operating parts at elevations lower than said reservoirs.

20. A multiple spindle machine tool comprising, in combination, a base housing, an upright column thereon, a rotary work table on the base housing rotatable about said column, an upright housing structure on the base housing including a top housing overreaching the work table and connected to said column, a plurality of vertical spindles above the work table, spindle driving gears in the top housing, a rotary cam device in the base housing, means operated by said cam device extending upwardly through said column and connected to the tool spindles for moving them vertically, and mechanism for rotating the tool spindles and cam device.

21. In a multiple spindle machine tool, the combination of an index work-carrier and a reciprocable multiple spindle tool-carrier, a rotary cam-carrier having opposed cams, a roller interposed between said cams and connected with said tool-carrier for imparting feed and return movements thereto by operation of said cam-carrier, and a guide roller for maintaining the cam roller in predetermined relation to said cams.

22. In a multiple spindle machine tool, the combination of a rotary work-carrier and a multiple spindle tool-carrier in concentric relation, a rotary cam-carrying body having annular axially spaced cam-carrying portions, cam plates attached to said portions and defining a camway, a roller disposed in said camway and adapted to be moved back and forth by said cams, and a connection between said roller and the tool-carrier for transmitting feed and return movements thereto including a supporting bearing for the roller at each end thereof for maintaining its face in parallel relation to the cam faces.

23. In a multiple spindle machine tool, the combination of a rotary work-carrier and a multiple spindle tool-carrier in concentric relation, a rotary cam-carrying device having opposed changeable segmental cam plates, a roller interposed between said cam plates and adapted to be moved back and forth thereby, and a connection between said roller and the tool-carrier for imparting feed and return movements thereto, including means reaching through the camway and providing support for the roller at the inner side of the cams.

24. In a multiple spindle machine tool, the combination of a work-carrier and a multiple spindle tool-carrier adapted to be relatively indexed, and means for relatively moving said carriers for effecting the feed comprising a rotary cam device having opposed cams, a cam roller interposed between said cams and adapted to be moved back and forth by rotation of said device for transmitting the feed movement, and a guide roller co-operating with said cam roller for maintaining it in predetermined relation to the cams.

25. In a multiple spindle machine tool, the combination of a work-carrier and a multiple spindle tool-carrier adapted to be relatively indexed, and means for relatively moving said carriers for effecting feed and return movements comprising opposed rotary cams, a roller interposed between said cams, and means revolubly supporting the roller at the inner and outer sides of the cams for holding its face parallel with the cam faces, the roller being operated by the cams for transmitting said feed and return movements.

26. In a multiple spindle machine tool, the combination of a work-carrier and a multiple spindle tool-carrier adapted to be relatively indexed, and means for relatively moving said carriers for effecting feed and return movements comprising a rotary cam-carrying body having integrally united, annular cam-carrying portions reinforced, by radially disposed ribs, segmental cam plates removably attached to said cam-carrying portions and defining a camway, and a roller disposed between said cam plates and adapted to be operated thereby for transmitting said feed and return movements.

27. In a multiple spindle machine tool, the combination of a work-carrier and a multiple spindle tool-carrier adapted to be relatively indexed, and means for relatively moving said carriers for effecting feed and return movements comprising a rotary cam-carrier having opposed cams, a roller interposed between said cams, and means supporting said roller in operative relation to the cams and through which said feed and return movements are imparted including a supporting bearing at the inner and outer ends of the roller for maintaining its face parallel to the face of said cams, and means including a guide roller for maintaining the axis of the cam roller in a plane radial with respect to the cam-carrier.

28. In a machine of the character described, the combination with a frame, a worktable thereon, and a tool carrier disposed in spaced relation to the worktable, the one indexing and the other reciprocating in the operation of the machine, a rotary cam carrier for producing the reciprocating motion, a worm gear for rotating the carrier, a worm meshing therewith, a shaft for turning the worm, a parallel shaft for transmitting the drive thereto, and two sets of gears connecting said shafts for driving the worm at two different speeds for feed and traverse.

29. A machine as set forth in claim 28 wherein one of the sets of gears is changeable to vary the rate of feed.

30. A machine as set forth in claim 28 wherein both sets of gears are constantly in mesh, either set of gears being arranged to be thrown selectively into action, the connection between a gear of one of said sets with one of said shafts being such that overrunning occurs when the other set of gears is in action.

31. A machine as set forth in claim 28 including means on the carrier for indexing the work table, and locking and unlocking the same.

LEE G. DANIELS.